(12) United States Patent
Ebbesen et al.

(10) Patent No.: US 10,612,516 B2
(45) Date of Patent: Apr. 7, 2020

(54) WIND TURBINE

(71) Applicant: Siemens Gamesa Renewable Energy A/S, Brande (DK)

(72) Inventors: Henning Ebbesen, Skjern (DK); Christian Laursen, Hedensted (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 304 days.

(21) Appl. No.: 15/627,557

(22) Filed: Jun. 20, 2017

(65) Prior Publication Data
US 2018/0010578 A1  Jan. 11, 2018

(30) Foreign Application Priority Data

Jul. 6, 2016 (EP) ..................................... 16178239

(51) Int. Cl.
*F03D 7/02* (2006.01)
*F03D 80/70* (2016.01)
*F03D 1/06* (2006.01)

(52) U.S. Cl.
CPC ......... *F03D 7/0224* (2013.01); *F03D 1/0658* (2013.01); *F03D 80/70* (2016.05); *F05B 2250/314* (2013.01); *Y02E 10/721* (2013.01); *Y02E 10/723* (2013.01)

(58) Field of Classification Search
CPC ....... F03D 1/0658; F03D 7/0224; F03D 80/70
See application file for complete search history.

(56) References Cited

U.S. PATENT DOCUMENTS

| 6,604,907 B1* | 8/2003 | Lehnhoff ............. F03D 7/0224 416/156 |
| 2011/0142645 A1 | 6/2011 | Nunez Polo et al. |
| 2012/0141280 A1 | 6/2012 | Holling |
| (Continued) | | |

FOREIGN PATENT DOCUMENTS

| CN | 101294541 A | 10/2008 |
| CN | 201650590 U | 11/2010 |
| (Continued) | | |

OTHER PUBLICATIONS

European Search Report for European Application No. 16178239.6, dated Jan. 12, 2017.
(Continued)

*Primary Examiner* — Sizo B Vilakazi
*Assistant Examiner* — Anthony L Bacon
(74) *Attorney, Agent, or Firm* — Schmeiser, Olsen & Watts LLP

(57) ABSTRACT

A wind turbine, including a hub, a blade, a blade bearing which is connected to the hub and which enables a rotational movement of the blade relative to the hub, and an adjustment device for adjusting a pitch angle of the blade, wherein the adjustment device includes at least one actuator and wherein an effective direction of an adjustment force of the at least one actuator when adjusting the pitch angle of the blade is tilted in an angle relative to a bearing plane of the blade bearing. One advantage of the wind turbine is that the adjustment force for adjusting the pitch angle is transmitted directly into the blade bearing or the bearing plane. Further, an offset of the attacking point of the adjustment force can be reduced or completely avoided.

16 Claims, 4 Drawing Sheets

(56) References Cited

U.S. PATENT DOCUMENTS

| | | | |
|---|---|---|---|
| 2013/0243598 A1 | 9/2013 | Ziegler et al. | |
| 2014/0301847 A1* | 10/2014 | Neubauer | F03D 1/0658 416/147 |
| 2015/0110631 A1* | 4/2015 | Christoffersen | F03D 1/0691 416/205 |
| 2015/0176567 A1* | 6/2015 | Fernandez Falces | F03D 1/0658 416/155 |
| 2015/0345475 A1* | 12/2015 | Carlsen | B08B 1/001 134/6 |
| 2016/0298604 A1* | 10/2016 | Guern | F03D 15/00 |
| 2016/0312766 A1* | 10/2016 | Rasmussen | F03D 7/0224 |
| 2016/0348647 A1* | 12/2016 | Ebbesen | F03D 80/70 |
| 2018/0051674 A1* | 2/2018 | Gaile | F03D 1/0658 |
| 2018/0372064 A1* | 12/2018 | Joensen | F03D 80/70 |

FOREIGN PATENT DOCUMENTS

| | | |
|---|---|---|
| CN | 204755199 U | 11/2015 |
| CN | 105508138 A | 4/2016 |
| EP | 2570662 A3 | 6/2013 |
| EP | 2679805 A1 | 1/2014 |
| EP | 2886858 A1 | 6/2015 |

OTHER PUBLICATIONS

Chinese Office Action for Application No. 201710546609.2, dated Nov. 21, 2018.

* cited by examiner

WIND TURBINE

CROSS-REFERENCE TO RELATED APPLICATIONS

This application claims priority to European application No. EP16178239.6 having a filing date of Jul. 6, 2016, the entire contents of which are hereby incorporated by reference.

FIELD OF TECHNOLOGY

The following relates to a wind turbine.

BACKGROUND

Modern wind turbine rotor blades are built from fiber-reinforced plastics. A rotor blade typically comprises an airfoil having a rounded leading edge and a sharp trailing edge. The rotor blade is connected with its blade root to the hub of the wind turbine. The rotor blade is connected to a blade bearing by an adjustment device that is configured to adjust a pitch angle of the rotor blade. The blade bearing is connected to the hub and allows a rotational movement of the rotor blade relative to the hub. The adjustment device comprises an actuator generating an adjustment force.

SUMMARY

An aspect relates to providing an improved wind turbine.

Accordingly, a wind turbine is provided. The wind turbine comprises a hub, a blade, a blade bearing which is connected to the hub and which enables a rotational movement of the blade relative to the hub, and an adjustment device for adjusting a pitch angle of the blade, wherein the adjustment device comprises at least one actuator and wherein an effective direction of an adjustment force of the at least one actuator when adjusting the pitch angle of the blade is tilted in an angle relative to a bearing plane of the blade bearing.

"Wind turbine" presently refers to an apparatus converting the wind's kinetic energy into rotational energy, which may again be converted to electrical energy by the apparatus.

The "pitch angle" means an angle which changes while the blade rotates around its longitudinal axis.

The "effective direction" of the adjustment force means the direction between two connecting portions of the actuator which support the adjustment force. The effective direction can be seen as the direction of a force vector of the adjustment force. Preferably, the effective direction of the adjustment force changes relative to the bearing plane while adjusting the pitch angle. Further, the wind turbine is configured such that an amount of the angle changes while the pitch angle is adjusted. These changes of the effective direction and the angle of the effective direction can be caused by a movement of one connecting portion of the actuator while the other connecting portion remains unmovable relative to the hub. Preferably, the angle measures greater than or exactly 1, 2, 3, 4, 5, 6, 7, 8, 9 or 10°. In particular, the angle measures between 1 and 5°, 5 and 10°, 10 and 15°, 15 and 20°, 20 and 30° or 30 and 45°. The angle of the effective direction preferably is an acute or sharp angle. An acute or sharp angle measures between greater than 0 and 90°. The angle of the effective direction can be noted as force angle.

The "bearing plane" means a plane which passes through the blade bearing and constitutes a ring plane of ring elements of the blade bearing. The bearing plane preferably passes through a center between an inner surface, in particular facing the hub, and an outer surface, in particular facing the blade, of an outer and/or an inner ring element of the blade bearing. Preferably, the bearing plane is essentially perpendicular to the longitudinal axis of the blade.

The wind turbine preferably comprises more than one blade. In particular, the wind turbine comprises three or more blades. Preferably, a separate adjustment device and a separate blade bearing relate to each blade. The blade bearing or each blade bearing preferably comprises a friction bearing or rolling contact bearing.

The advantages of the wind turbine are the following. The adjustment force is transmitted directly into the blade bearing or the bearing plane. An offset of the attacking point of the adjustment force can be reduced or completely avoided. Thus, smaller bending moments due to the adjustment force are transmitted into the blade bearing. Further, short elements for transmitting the adjustment force can be provided such that leverage effects can be reduced.

According to an embodiment, the adjustment device comprises a reinforcement ring which is arranged parallel to the bearing plane of the blade bearing.

The advantages of the reinforcement ring are the following. Less material is needed in the adjustment device because of a high resistance moment of ring elements and high resistance against warping. The allocation of the material is advantageous because the material is located at radially outer portions. Thus, it is possible to reduce the weight of the wind turbine. Further, service will be better and faster compared with an element without a ring opening. It gives much better access to grease distribution components. The reinforcement ring reinforces the adjustment device. Further, the reinforcement element is configured to receive the adjustment force of the at least one actuator, in particular of two actuators which are connected to the reinforcement ring. The reinforcement ring preferably has a circular ring shape. In particular, the reinforcement ring comprises steel or is made of steel. Preferably, two reinforcement rings are provided. The reinforcement ring can be located at the inner side of the adjustment device facing the hub, the outer side of the adjustment device facing the blade or at both sides.

According to a further embodiment, an inner surface of the reinforcement ring faces the hub.

Thus, the reinforcement ring, in particular the inner surface of the reinforcement ring, can be mechanically connected to an inner side of the hub.

According to a further embodiment, the adjustment device comprises at least one ring interface which connects the at least one actuator to the reinforcement ring.

Thus, the adjustment device transmits the adjustment force directly to the reinforcement ring such that the ring rotates preferably around a center of its outer circular contour. The ring interface moves relatively to the hub while the pitch angle is adjusted. Thus, while the ring interface is moving relatively to the hub the amount of the angle changes. In particular, if the actuator extends the amount of the angle decreases relative to the bearing plane and vice versa.

According to a further embodiment, the at least one ring interface comprises an inner plate which is connected to an inner surface of the reinforcement ring, an outer plate which is connected to an outer surface of the reinforcement ring, a pillar portion which connects the inner plate with the outer plate, and a lug which encompasses the pillar portion between the inner plate and the other plate and which is connected to the at least one actuator, wherein the inner plate and the outer plate are arranged parallel to each other.

Thus, the adjustment force is transmitted by the lug to the pillar portion and from the pillar portion by the inner plate and the other plate to the reinforcement ring. The lug enables a rotational movement around the pillar portion. Thus, tensions between the at least one actuator and the reinforcement ring are avoided. Preferably, the inner plate and the outer plate are arranged parallel to the bearing plane. Alternatively, the inner plate and the outer plate are tilted relative to the bearing plane. Preferably, the inner plate and outer plate are provided as a bracket or bracket portions.

According to a further embodiment, the wind turbine further comprises at least one hub interface which connects the at least one actuator to the hub.

Thus, the adjustment force is supported by the hub interface at the hub. Preferably, the hub interface is fixed at the hub such that no relative movement is possible. Preferably, the hub interface comprises a support element, in particular a protruding portion, for receiving the reaction of the adjustment force.

According to a further embodiment, the at least one hub interface comprises a first plate which is connected to the hub, a second plate which is arranged parallel to the first plate and which is connected to the hub, a pillar portion connecting the first plate with the second plate, and a lug which encompasses the pillar portion between the first plate and the second plate and which is connected to the at least one actuator.

Preferably, the first plate and second plate are provided as a bracket or bracket portions. The lug enables a rotational movement around the pillar portion. Thus, tensions between the at least one actuator and the hub are avoided or reduced.

According to a further embodiment, the first plate and the second plate are tilted in an angle relatively to the bearing plane of the blade bearing.

Thus, bending of the first and the second plate is reduced or completely avoided while the reaction of the adjustment force is transmitted to the hub. Preferably, the angle measures greater than or exactly 0, 1, 2, 3, 4, 5, 6, 7, 8, 9 or 10°. In particular, the angle measures between 1 and 5°, 5 and 10°, 10 and 15°, 15 and 20°, 20 and 30° or 30 and 45°. Alternatively, the angle measures between greater than 0 and less than 90°.

According to a further embodiment, the wind turbine comprises a first hub interface and a second hub interface, wherein the adjustment device comprises a first actuator, a second actuator, a first ring interface and a second ring interface, and wherein the first actuator is connected by means of the first hub interface to the hub and by means of the first ring interface to the reinforcement ring and wherein the second actuator is connected by the second hub interface to the hub and by the second ring interface to the reinforcement ring.

Preferably, the angular distance between first hub interface and the second hub interface and/or between the first ring interface and the second ring interface measures 120 or 180°.

According to a further embodiment, the at least one actuator comprises a hydraulic cylinder, a pneumatic cylinder or an electric motor.

Preferably, the actuator is tilted in the angle of the effective direction relative to the bearing plane.

According to a further embodiment, the adjustment device comprises a support plate which is arranged parallel to the bearing plane of the blade bearing and which is located on an outer surface of the adjustment device facing the blade.

The support plate may be connected directly or indirectly to the reinforcement ring. Alternatively, the at least one actuator is connected to the support plate such that the effective direction of the adjustment force of the at least one actuator when adjusting the pitch angle of the blade is tilted in the angle relative to the bearing plane of the blade bearing. Preferably, the blade, in particular a blade root, is connected to the support plate.

According to a further embodiment, the support plate is ring shaped or circular ring shaped.

Preferably, the support plate is a second reinforcement ring.

According to a further embodiment, the blade is connected to the support plate.

Preferably, the blade or the blade root is connected to the support plate provided as a reinforcement ring. Thus, the reinforcement ring can serve as an interface between the blade bearing and the blade or the blade root.

The support plate preferably comprises an opening which encompasses partially the blade or the blade root.

According to a further embodiment, the adjustment device comprises a connecting ring constituting a radial outer portion of the adjustment device which is located at an inner side of the blade bearing.

Preferably, the connecting ring serves as a bearing seat or a further ring element which preferably serves as a bearing seat is connected to a radial outer portion of the connecting ring.

According to a further embodiment, the reinforcement ring is connected to a first end of the connecting ring and the support plate is connected to a second end of the connecting ring.

Preferably, the reinforcement ring, the connecting ring and the support plate are configured to rotate together while the pitch angle is adjusted.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

In the Figures, like reference numerals designate like or functionally equivalent elements, unless otherwise indicated.

DETAILED DESCRIPTION

Figure 1:
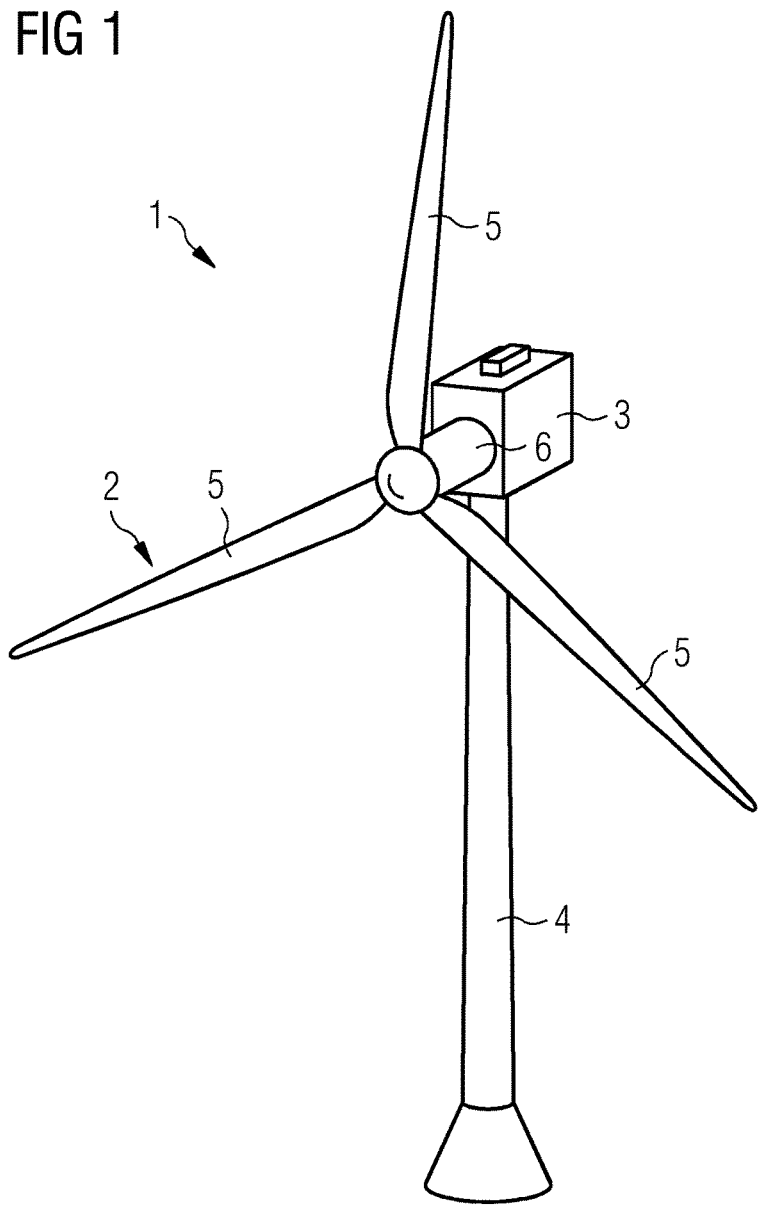
FIG. 1 is a perspective view of a wind turbine according to one embodiment.

FIG. 1 shows a wind turbine 1 according to an embodiment.

The wind turbine 1 comprises a rotor 2 connected to a generator (not shown) arranged inside a nacelle 3. The nacelle 3 is arranged at the upper end of a tower 4 of the wind turbine 1.

The rotor 2 comprises three blades 5. The blades 5 are connected directly or indirectly to a hub 6 of the wind turbine 1. Rotors 2 of this kind may have diameters ranging from, for example, 30 to 160 meters or even more. The blades 5 are subjected to high wind loads. At the same time, the blades 5 need to be lightweight. For these reasons, blades 5 in modern wind turbines 1 are manufactured from fiber-reinforced composite materials. Therein, glass fibers are generally preferred over carbon fibers for cost reason. Oftentimes, glass fibers in the form of unidirectional fiber mats are used.

Figure 2:
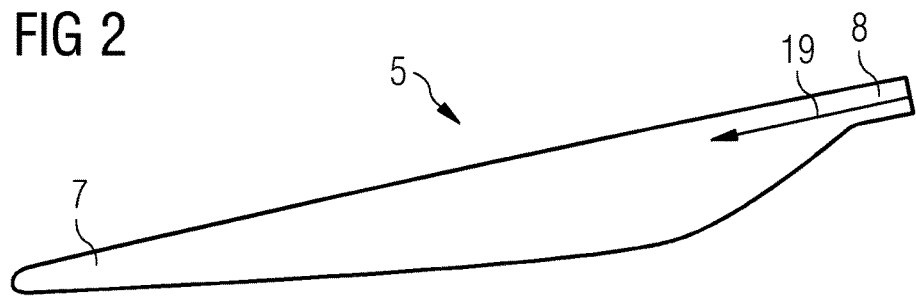
FIG. 2 is a perspective view of a wind turbine rotor blade according to one embodiment.

FIG. 2 shows a blade 5 according to one embodiment.

The blade 5 comprises an aerodynamically designed portion 7, which is shaped for optimum exploration of the wind energy and a blade root 8 for connecting the blade to the hub 6.

Figure 3:
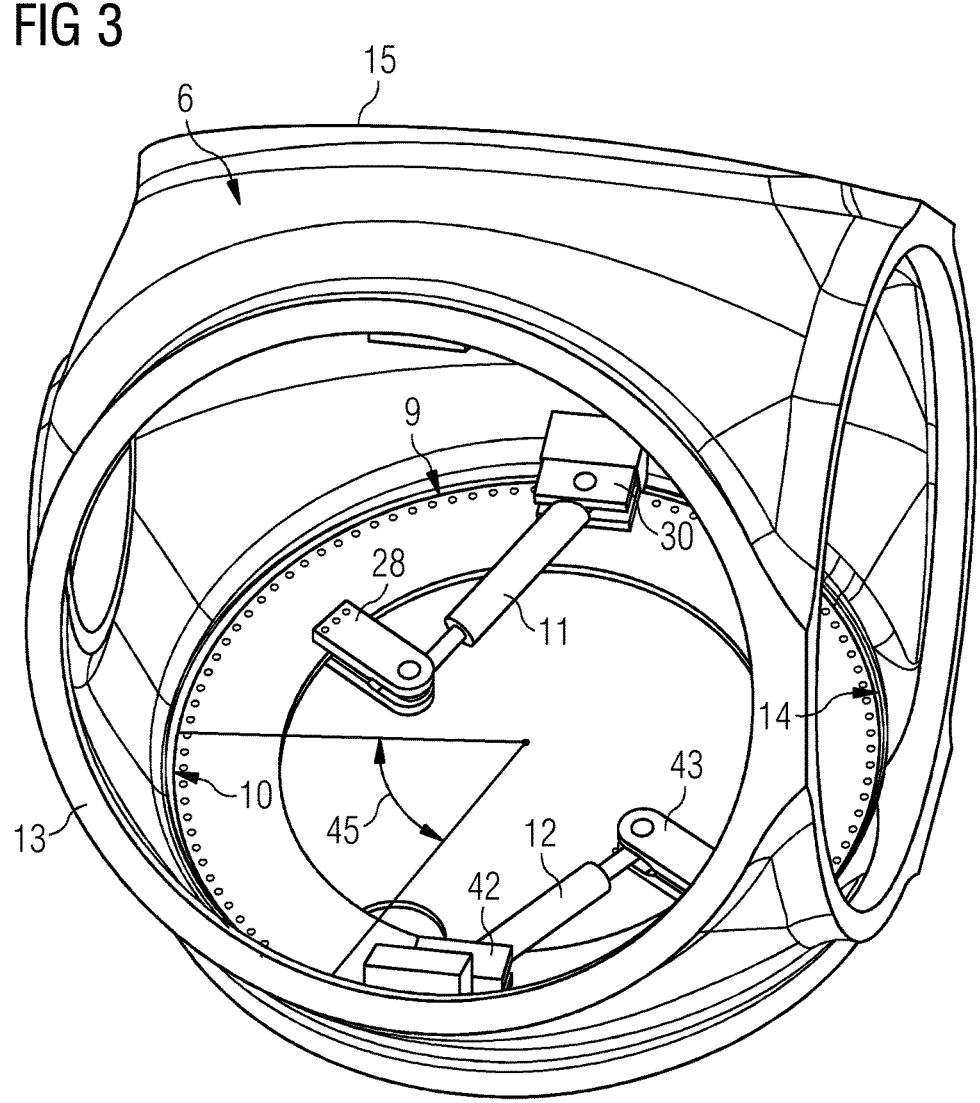
FIG. 3 is a perspective view of a hub and an adjustment device according to one embodiment.

FIG. 3 shows a hub 6 and an adjustment device 9 according to one embodiment.

The adjustment device 9 is arranged inside a blade bearing 10 and is configured to adjust a pitch angle of the blade 5. The blade bearing 10 is connected to the hub 6 and enables a rotational movement of the blade 5 relative to the hub 6 by the adjustment device 9. The adjustment device 9 comprises at least one actuator 11, 12. Preferably, the adjustment devise comprises a first actuator 11 and a second actuator 12. The at least one actuator 11, 12 is configured to adjust the pitch angle of the blade 5 and comprises a hydraulic cylinder, a pneumatic cylinder or an electric motor. The hub 6 comprises three opening portions 13, 14, 15 at which blade bearings 10 are located. Preferably, the opening portions 13, 14, 15 have a circular shape.

Figure 4:
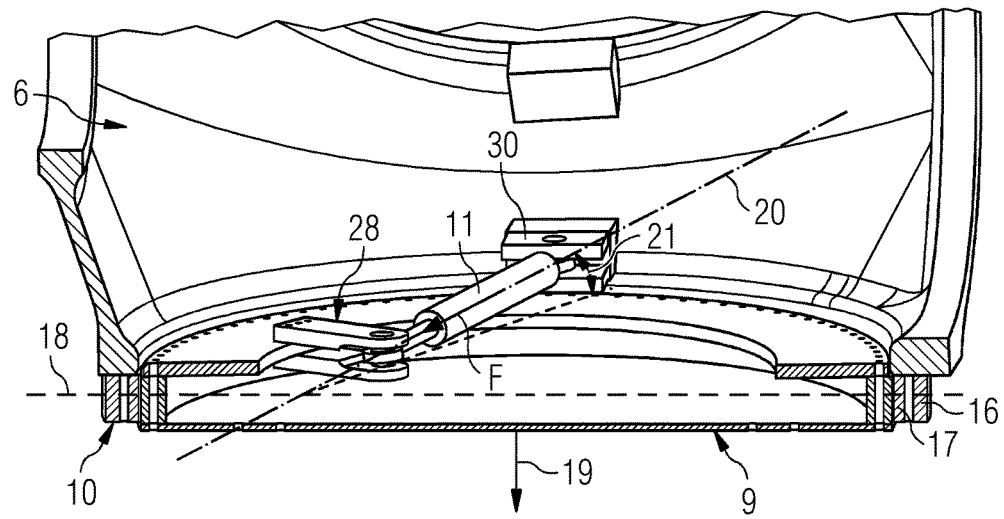
FIG. 4 is a sectional view of the hub and the adjustment device.

FIG. 4 shows a sectional view of the hub 6 and the adjustment device 9.

The blade bearing 10 comprises a friction bearing or a rolling contact bearing and is connected to the hub 6. Further, the blade bearing 10 comprises at least one ring shaped element 16, 17. Preferably, a first circular ring shaped element 16 is fixed to the hub 6 and a second circular ring shaped element 17 is fixed to the adjustment device 9, wherein the second circular ring shaped element 17 is configured to rotate relative to the first circular ring shaped element 16. A bearing plane 18 passes through the blade bearing 10 and constitutes a ring plane of the at least one ring element 16, 17. Preferably, the bearing plane 18 passes through a center between an inner surface, in particular facing the hub 6, and an outer surface, in particular facing the blade 5, of the outer and/or the inner ring element 16, 17 of the blade bearing 10. Preferably, the bearing plane 18 is essentially perpendicular to a longitudinal axis 19 of the blade 5 (see also FIG. 2).

The at least one actuator 11, 12 generates an adjustment force F which is supported at the hub 6 and which rotates the blade 5 around its longitudinal axis 19. An effective direction 20 of the adjustment force F of the at least one actuator 11, 12 when adjusting the pitch angle of the blade 5 is tilted in an angle 21 relative to the bearing plane 18 of the blade bearing 10. Preferably, the angle 21 measures greater than or exactly 1, 2, 3, 4, 5, 6, 7, 8, 9 or 10°. In particular, the angle measures between 1 and 5°, 5 and 10°, 10 and 15°, 15 and 20°, 20 and 30° or 30 and 45°. Alternatively, the angle 21 measures between 0 and 90°. Preferably, the effective direction 20 of the adjustment force F changes relative to the bearing plane 18 while adjusting the pitch angle. Further, the wind turbine 1 is configured such that the amount of the angle 21 changes while the pitch angle is adjusted.

Figure 5:
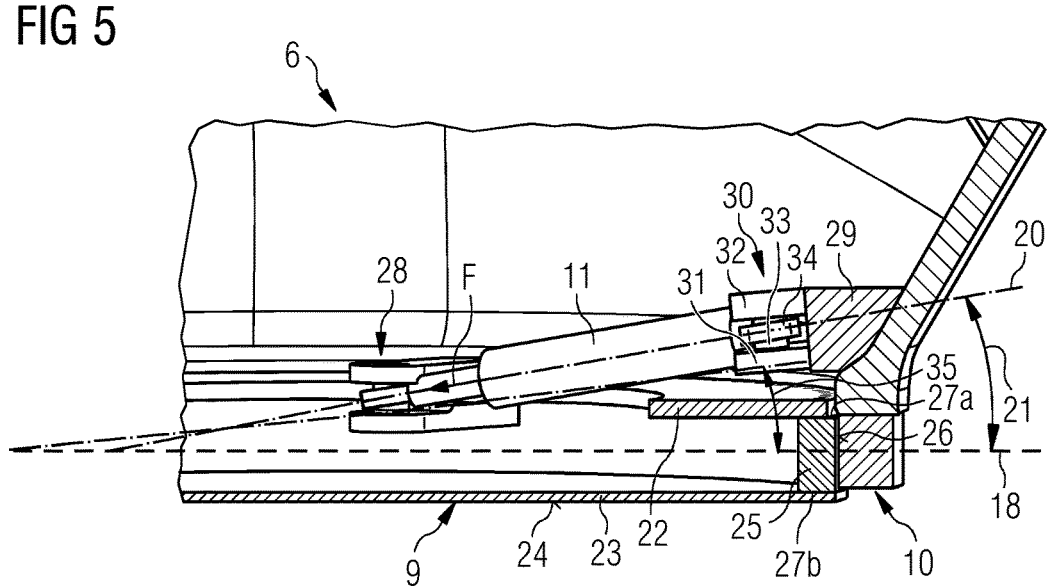
FIG. 5 is a further sectional view of the hub and the adjustment device.

FIG. 5 shows a further sectional view of the hub 6 and the adjustment device 9.

The adjustment device 9 comprises a reinforcement ring 22 which is arranged parallel to the bearing plane 18 of the blade bearing 10. The reinforcement ring 22 may have a circular ring shape. The adjustment device 9 further comprises support plate 23 which is arranged parallel to the bearing plane 18 of the blade bearing 10 and which is located on an outer surface 24 of the adjustment device 9 facing the blade 5. The outer surface of the support plate 23 may constitute the outer surface 24 of the adjustment device 9. Preferably, the support plate 23 is ring shaped or circular ring shaped. The blade 5 is connected directly or indirectly to the support plate 23. The adjustment device 9 further comprises a connecting ring 25 constituting a radial outer portion of the adjustment device 9 which is located at an inner side 26 of the blade bearing 10. The reinforcement ring 22 is connected to a first end 27a of the connecting ring 25, wherein the support plate 23 is connected to a second end 27b of the connecting ring 25. Thus, while adjusting the pitch angle of the blade 5 the reinforcement ring 22, the connecting ring 25, the support plate 23 and the blade 5 rotate essentially around the longitudinal axis 19 of the blade 5 relative to the hub 6.

Preferably, the adjustment device 9 comprises a second reinforcement ring. The support plate 23 may be the second or a third reinforcement ring.

Further, the adjustment device 9 comprises at least one ring interface 28 which connects the at least one actuator 11, 12 to the reinforcement ring 22. The hub 6 comprises a protruding portion 29 which serves as a reinforcement element, wherein the at least one actuator 11 is also connected to the protruding portion 29 by at least one hub interface 30. The at least one hub interface 30 comprises a first plate 31 which is connected to the protruding portion 29 of the hub 6 and a second plate 32 which is arranged parallel to the first plate 31 and which is also connected to the protruding portion 29 of the hub 6. The at least one hub interface 30 further comprises a pillar portion 33 connecting the first plate 31 with the second plate 32, and a lug 34 which encompasses the pillar portion 33 between the first plate 31 and the second plate 32 and which is connected to the at least one actuator 11.

The first plate 31 and the second plate 32 are tilted in an angle 35 relatively to the bearing plane 18 of the blade bearing 10. Preferably, the angle 35 is identical to the angle 21 of the effective direction 20 of the adjustment force F. Alternatively, the angle 35 is smaller than the angle 21 of the effective direction 20 of the adjustment force F. In particular, the angle 35 measures between 1 and 5°, 5 and 10°, 10 and 15°, 15 and 20°, 20 and 30° or 30 and 45°.

Figure 6:
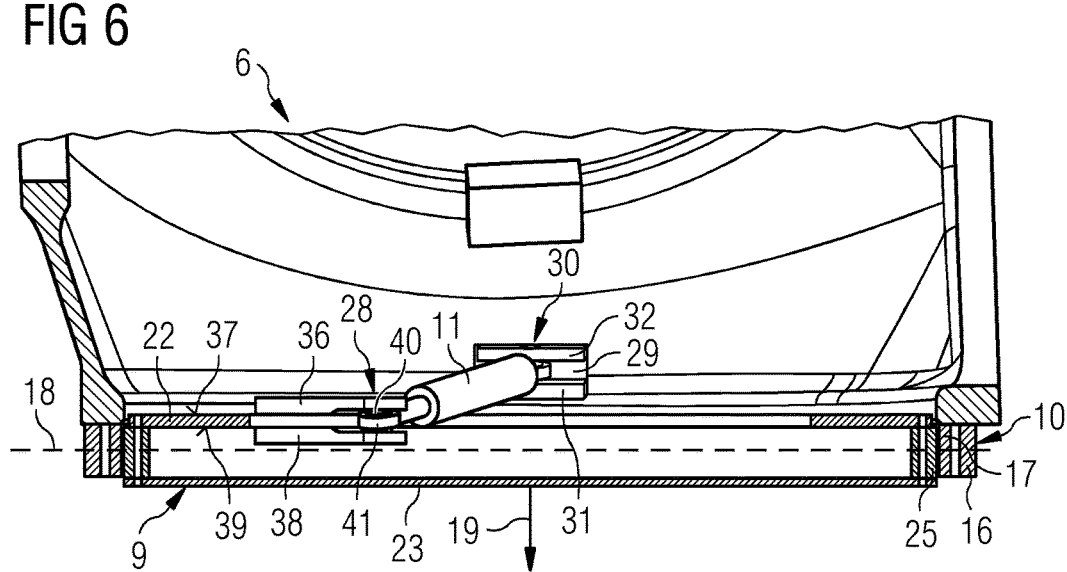
FIG. 6 is a further sectional view of the hub and the adjustment device.

FIG. 6 shows a further sectional view of the hub 6 and the adjustment device 9.

The at least one ring interface 28 comprises an inner plate 36 which is connected to an inner surface 37 of the reinforcement ring 22 and an outer plate 38 which is connected to an outer surface 39 of the reinforcement ring 22. The at least one ring interface 28 further comprises a pillar portion 40 which connects the inner plate 36 with the outer plate 38, and a lug 41 which encompasses the pillar portion 40 between the inner plate 36 and the other plate 38 and which is connected to the at least one actuator 11. Preferably, the inner plate 36 and the outer plate 38 are arranged parallel to each other and may be parallel to the bearing plane 18.

Figure 7:
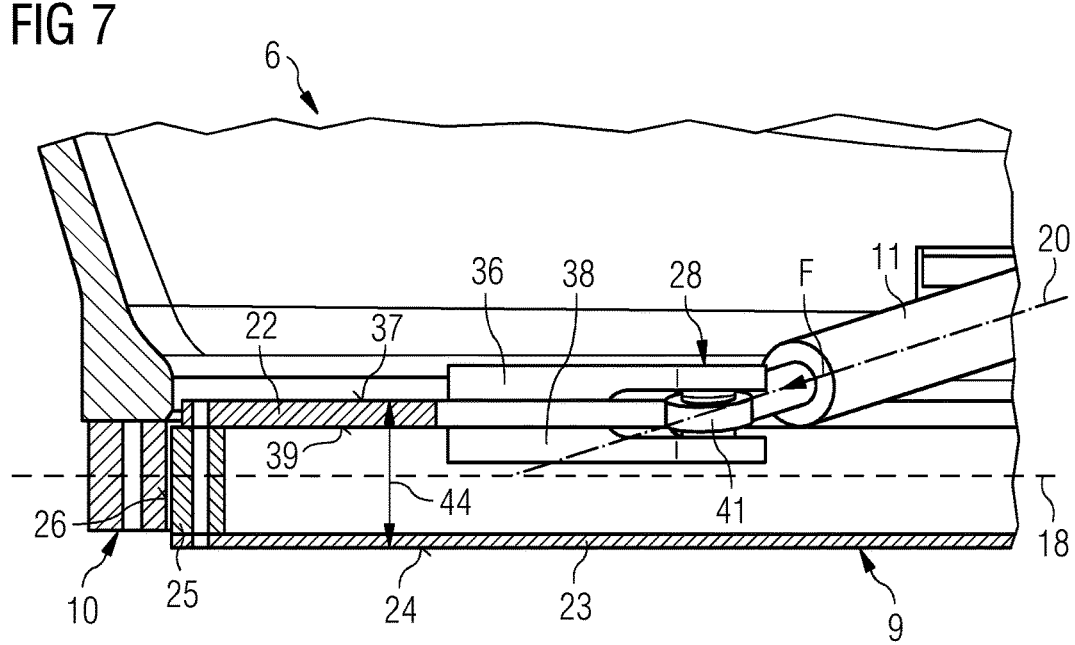
FIG. 7 is a further sectional view of the hub and the adjustment device.

FIG. 7 shows a further sectional view of the hub 6 and the adjustment device 9.

The lug 41 is tilted relative to the inner and outer plate 36, 38. Preferably, the lug 41 is tilted in the angle 21 relative to the bearing plane 18 of the blade bearing 10. Further, as the amount of the angle 21 can change while the pitch angle is adjusted, the lug 41 also can change its tilt analogously. Preferably, the adjustment force F is attacking in an area 44 between the inner surface 37 of the reinforcement ring 22 and the outer surface 24 of the support plate 23. Thus, the adjustment force F can be transmitted directly form the at least one actuator 11, 12 into the blade bearing 10. Preferably, the adjustment force F is transmitted directly into the bearing plane 18.

Preferably, the wind turbine 1 comprises a first hub interface 30 and a second hub interface 42 (FIG. 3). The adjustment device 9 comprises the first actuator 11, the second actuator 12, the first ring interface 28 and a second ring interface 43 (FIG. 3). The first actuator 11 is connected by the first hub interface 30 to the hub 6 and by the first ring interface 28 to the reinforcement ring 22. The second actuator 12 is connected by the second hub interface 42 to the hub 6 and by the second ring interface 43 to the reinforcement ring 22. Preferably, the first hub interface 30 is provided opposite to the second hub interface 42. The first ring interface 28 may be opposite to the second ring interface 43. Thus, two adjustment forces preferably adjust the pitch angle of one blade 5.

The pitch angle essentially can be seen as a rotation angle 45 of a portion of the adjustment device 9, in particular the ring element 16, 17, the reinforcement ring 22, and/or the support plate 23, relative to the hub 6 (FIG. 3).

Although embodiments of the present invention have been described in accordance with preferred embodiments, it is obvious for the person skilled in the art that modifications are possible in all embodiments.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine, comprising a hub, a blade, a blade bearing which is connected to the hub and which enables a rotational movement of the blade relative to the hub, and an adjustment device for adjusting a pitch angle of the blade, wherein the adjustment device comprises at least one actuator and wherein an effective direction of an adjustment force of the at least one actuator when adjusting the pitch angle of the blade is tilted at an acute angle relative to a bearing plane of the blade bearing.

2. The wind turbine according to claim 1, wherein the adjustment device comprises a reinforcement ring which is arranged parallel to the bearing plane of the blade bearing.

3. The wind turbine according to claim 2, wherein an inner surface of the reinforcement ring faces the hub.

4. The wind turbine according to claim 2, wherein the adjustment device comprises at least one ring interface which connects the at least one actuator to the reinforcement ring.

5. The wind turbine according to claim 4, wherein the at least one ring interface comprises an inner plate which is connected to an inner surface of the reinforcement ring, an outer plate which is connected to an outer surface of the reinforcement ring, a pillar portion which connects the inner plate with the outer plate, and a lug which encompasses the pillar portion between the inner plate and the other plate and which is connected to the at least one actuator, wherein the inner plate and the outer plate are arranged parallel to each other.

6. The wind turbine according to claim 1, further comprising at least one hub interface which connects the at least one actuator to the hub.

7. The wind turbine according to claim 6, wherein the at least one hub interface comprises a first plate which is connected to the hub, a second plate which is arranged parallel to the first plate and which is connected to the hub, a pillar portion connecting the first plate with the second plate, and a lug which encompasses the pillar portion between the first plate and the second plate and which is connected to the at least one actuator.

8. The wind turbine according to claim 7, wherein the first plate and the second plate are tilted in an angle relatively to the bearing plane of the blade bearing.

9. The wind turbine according to claim 4, further comprising a first hub interface and a second hub interface, wherein the adjustment device comprises a first actuator, a second actuator, a first ring interface and a second ring interface, and wherein the first actuator is connected by the first hub interface to the hub and by the first ring interface to the reinforcement ring and wherein the second actuator is connected by the second hub interface to the hub and by the second ring interface to the reinforcement ring.

10. The wind turbine according to claim 1, wherein the at least one actuator comprises a hydraulic cylinder, a pneumatic cylinder or an electric motor.

11. The wind turbine according to claim 1, wherein the adjustment device comprises a support plate which is arranged parallel to the bearing plane of the blade bearing and which is located on an outer surface of the adjustment device facing the blade.

12. The wind turbine according to claim 11, wherein the support plate is ring shaped or circular ring shaped.

13. The wind turbine according to claim 11, wherein the blade is connected to the support plate.

14. The wind turbine according to claim 1, wherein the adjustment device comprises a connecting ring constituting a radial outer portion of the adjustment device which is located at an inner side of the blade bearing.

15. The wind turbine according to claim 2, wherein the reinforcement ring is connected to a first end of the connecting ring and wherein the support plate is connected to a second end of the connecting ring.

16. A wind turbine, comprising:
a hub,
a blade,
a blade bearing connected to the hub, the blade bearing enabling a rotational movement of the blade relative to the hub, and
an adjustment device for adjusting a pitch angle of the blade, wherein the adjustment device comprises at least one actuator, wherein an effective direction of an adjustment force of the at least one actuator is tilted at an angle, wherein the angle is greater than or exactly 1 degree and less than or exactly 45 degrees relative to a bearing plane of the blade bearing when adjusting the pitch angle of the blade.

\* \* \* \* \*